United States Patent
Zheng et al.

(10) Patent No.: US 12,293,283 B2
(45) Date of Patent: May 6, 2025

(54) REINFORCEMENT LEARNING USING META-LEARNED INTRINSIC REWARDS

(71) Applicant: DeepMind Technologies Limited, London (GB)

(72) Inventors: Zeyu Zheng, Ann Arbor, MI (US); Junhyuk Oh, London (GB); Satinder Singh Baveja, Ann Arbor, MI (US)

(73) Assignee: DeepMind Technologies Limited, London (GB)

( * ) Notice: Subject to any disclaimer, the term of this patent is extended or adjusted under 35 U.S.C. 154(b) by 1070 days.

(21) Appl. No.: 17/033,410

(22) Filed: Sep. 25, 2020

(65) Prior Publication Data

US 2021/0089910 A1    Mar. 25, 2021

Related U.S. Application Data

(60) Provisional application No. 62/905,964, filed on Sep. 25, 2019.

(51) Int. Cl.
| | |
|---|---|
| *G06N 3/08* | (2023.01) |
| *G06N 3/04* | (2023.01) |
| *G06N 3/044* | (2023.01) |
| *G06N 3/045* | (2023.01) |
| *G06N 3/084* | (2023.01) |

(52) U.S. Cl.
CPC ............... *G06N 3/08* (2013.01); *G06N 3/044* (2023.01); *G06N 3/045* (2023.01); *G06N 3/084* (2013.01)

(58) Field of Classification Search
CPC ........... G06N 3/08; G06N 3/044; G06N 3/045
See application file for complete search history.

(56) References Cited

U.S. PATENT DOCUMENTS

2019/0279081 A1 * 9/2019 Pham .................. G06N 3/08

FOREIGN PATENT DOCUMENTS

| WO | WO 2018153807 A1 * | 2/2018 | ............. G06N 3/044 |
| WO | WO 2018156891 A1 * | 2/2018 | ............. G06N 3/006 |

OTHER PUBLICATIONS

Şimşek, Ö., & Barto, A. G. (2006). An intrinsic reward mechanism for efficient exploration. An Intrinsic Reward Mechanism for Efficient Exploration. https://doi.org/10.1145/1143844.1143949 (Year: 2006).*

(Continued)

*Primary Examiner* — Michael W Ayers
*Assistant Examiner* — Matiyas T Maru
(74) *Attorney, Agent, or Firm* — Fish & Richardson P.C.

(57) ABSTRACT

There is described methods, systems, and apparatus, including computer programs encoded on a computer storage medium, for training a reinforcement learning system. The reinforcement learning system comprises an agent configured to perform actions based upon a policy and an intrinsic reward system configured to generate intrinsic reward values for the agent based upon the actions taken by the agent. The method comprises training the reinforcement learning system based upon a plurality of tasks. The training comprises updating the agent's policy based upon the intrinsic reward values generated by the intrinsic reward system and updating the intrinsic reward system based upon an extrinsic reward value obtained based upon the task being performed by the agent. The training further comprises re-initializing the agent's policy when an expiration criterion associated with the agent is met.

20 Claims, 6 Drawing Sheets

(56) References Cited

OTHER PUBLICATIONS

Singh, S., Lewis, R. L., Barto, A. G., & Sorg, J. (2010). Intrinsically Motivated Reinforcement Learning: an Evolutionary perspective. IEEE Transactions on Autonomous Mental Development, 2(2), 70-82. https://doi.org/10.1109/tamd.2010.2051031 (Year: 2010).*

Kulkarni, T., Narasimhan, K., Saeedi, A., & Tenenbaum, J. B. (2016). Hierarchical deep reinforcement learning: integrating temporal abstraction and intrinsic motivation. arXiv (Cornell University). https://arxiv.org/pdf/1604.06057.pdf (Year: 2016).*

Zheng, Z., Oh, J., & Singh, S. (2018). On learning intrinsic rewards for policy gradient methods. arXiv (Cornell University), 31, 4644-4654. https://arxiv.org/pdf/1804.06459.pdf (Year: 2018).*

Kahn, Gregory, et al. "Self-supervised deep reinforcement learning with generalized computation graphs for robot navigation." 2018 IEEE International Conference on Robotics and Automation (ICRA), 2018, https://doi.org/10.1109/icra.2018.8460655. (Year: 2018).*

Savinov, et al., "Episodic curiosity through reachability." (Year: 2018).*

Ostrovski, et al., "Count-based exploration with neural density models." (Year: 2017).*

Montúfar et al., "Information theoretically aided reinforcement learning for embodied agents." (Year: 2016).*

AssaAbloy.com [online], "Faulty Reward Functions in the Wild," Dec. 21, 2016, retrieved on Jan. 29, 2021, retrieved from URL<https://openai.com/blog/faulty-reward-functions/>, 4 pages.

Bahdanau et al., "Learning to understand goal specifications by modelling reward," CoRR, Jun. 2018, arxiv.org/abs/1806.01946, 19 pages.

Bechtle et al., "Meta-learning via learned loss," CoRR, Jun. 2019, arXiv:1906.05374, 9 pages.

Bellemare et al., "Unifying count-based exploration and intrinsic motivation," CoRR, Nov. 2016, arxiv.org/abs/1606.01868, 20 pages.

Cohen et al., "Should I stay or should I go? How the human brain manages the tradeoff between exploitation and exploration," Philosophical Transactions of the Royal Society B: Biological Sciences, May 2007, 362(1481):933-942.

Duan et al., "One-shot imitation learning," CoRR, Mar. 2017, arxiv.org/abs/1703.07326, 27 pages.

Duan et al., "RL2: Fast reinforcement learning via slow reinforcement learning," CoRR, Nov. 2016, arXiv:1611.02779, 14 pages.

Dubey et al., "Reconciling novelty and complexity through a rational analysis of curiosity," Psychological Review, 2020, 127(3):455-476.

Finn et al., "Model-agnostic metalearning for fast adaptation of deep networks," Proceedings of the 34th International Conference on Machine Learning, Jul. 2017, 70:1126-1135.

Finn et al., "Oneshot visual imitation learning via meta-learning," Proceedings of the 1st Annual Conference on Robot Learning, Oct. 2018, 78:357-368.

Gittins, "Bandit processes and dynamic allocation indices," Journal of the Royal Statistical Society: Series B (Methodological), Jan. 1979, 41(2):148-177.

Gordon et al., "Reinforcement active learning hierarchical loops," The 2011 International Joint Conference on Neural Networks, Jul. 2011, pp. 3008-3015.

Goyal et al., "Infobot: Transfer and exploration via the information bottleneck," CoRR, Jan. 2019, arxiv.org/abs/1901.10902, 21 pages.

Guo et al., "Deep learning for reward design to improve monte carlo tree search in atari games," CoRR, Apr. 2016, arxiv.org/abs/1604.07095, 7 pages.

Harada et al., "Policy invariance under reward transformations: Theory and application to reward shaping," Proceedings of the Sixteenth International Conference on Machine Learning, 1999, 10 pages.

Harutyunyan et al., "Expressing arbitrary reward functions as potential-based advice," In Proceedings of the Twenty-Ninth AAAI Conference on Artificial Intelligence, Feb. 2015, 29(1):2652-2658.

Itti et al., "Bayesian surprise attracts human attention," Vision Research, Jun. 2009, 49(10):1295-1306.

Kirsch et al., "Improving generalization in meta reinforcement learning using learned objectives," CoRR, Oct. 2019, arxiv.org/abs/1910.04098, 21 pages.

Learning to learn: Introduction and overview, Springer, 1998, Chapter 1, 15 pages.

Linke et al., "Adapting behaviour via intrinsic reward: A survey and empirical study," Jair, Dec. 2020, 69:1287-332.

Metz et al., "Meta-learning update rules for unsupervised representation learning," CoRR, Mar. 2018, arxiv.org/abs/1804.00222, 27 pages.

Mirolli et al., "Functions and mechanisms of intrinsic motivations," Intrinsically Motivated Learning in Natural and Artificial Systems, Nov. 2012, pp. 49-72.

Nagabandi et al., "Learning to adapt in dynamic, real-world environments through meta-reinforcement learning," CoRR, Mar. 2018, arxiv.org/abs/1803.11347, 17 pages.

Ostrovski et al., "Count-based exploration with neural density models," Proceedings of the 34th International Conference on Machine Learning, Jul. 2017, 70:2721-2730.

Oudeyer et al., "Intrinsic motivation systems for autonomous mental development," IEEE transactions on evolutionary computation, Apr. 2007, 11(2):265-286.

Pathak et al., "Curiosity-driven exploration by self-supervised prediction," Proceedings of the 34th International Conference on Machine Learning, Jul. 2017, 70:2778-2787.

Poupart et al., "An analytic solution to discrete bayesian reinforcement learning," Proceedings of the 23rd International Conference on Machine Learning, Jun. 2006, pp. 697-704.

Randlov et al., "Learning to drive a bicycle using reinforcement learning and shaping," Proceedings of the Fifteenth International Conference on Machine Learning, Jul. 1998, 98:463-471.

Schlegel et al., "Discovery of predictive representations with a network of general value functions," ICLR, Feb. 2018, 14 pages.

Schmidhuber et al., "Curious model-building control systems," In Proc. international joint conference on neural networks, 1991, 2:1458-1463.

Schmidhuber et al., "Simple principles of metalearning," Technical Report IDSIA, Jun. 1996, 23 pages.

Schmidhuber, "A possibility for implementing curiosity and boredom in model-building neural controllers," Proc. of the international conference on simulation of adaptive behavior: From animals to animats, 1991, pp. 222-227.

Singh et al., "Intrinsically motivated reinforcement learning: An evolutionary perspective," IEEE Transactions on Autonomous Mental Development, Jun. 2010, 2(2):70-82.

Singh et al., "Where do rewards come from?," Proceedings of the annual conference of the cognitive science society, Aug. 2009, pp. 2601-2606.

Sorg et al., "Reward design via online gradient ascent," Advances in Neural Information Processing Systems, 2010, pp. 2190-2198.

Stadie et al., "The importance of sampling inmeta-reinforcement learning," Advances in Neural Information Processing Systems, Dec. 2018, pp. 9280-9290.

Strehl et al., "An analysis of modelbased interval estimation for markov decision processes," Journal of Computer and System Sciences, Dec. 2008, 74(8):1309-1331.

Sutton et al., "Policy gradient methods for reinforcement learning with function approximation," Advances in Neural Information Processing Systems, Nov. 1999, 99:1057-1063.

Sutton, "Integrated architectures for learning, planning, and reacting based on approximating dynamic programming," Proceedings of the Seventh International Conference on Machine Learning, Jun. 1990, pp. 216-224.

Thompson, "On the likelihood that one unknown probability exceeds another in view of the evidence of two samples," Biometrika, Dec. 1933, 25(3/4):285-294.

Veeriah et al., "Discovery of useful questions as auxiliary tasks," CoRR, Sep. 2019, arxiv.org/abs/1909.04607, 17 pages.

Wang et al., "Learning to reinforcement learn," CoRR, Nov. 2016, arxiv.org/abs/1611.05763, 17 pages.

(56) References Cited

OTHER PUBLICATIONS

Watkins, "Learning from delayed rewards," Thesis for the degree of Doctor, King's College, May 1989, 241 pages.

Williams, "Simple statistical gradient-following algorithms for connectionist reinforcement learning," Machine Learning, May 1992, 8(3-4):229-256.

Wilson et al., "Humans use directed and random exploration to solve the explore-exploit dilemma," Journal of Experimental Psychology: General, Dec. 2014, 143(6):2074-2081.

Xu et al., "Learning a prior over intent via meta-inverse reinforcement learning," Proceedings of the 36th International Conference on Machine Learning, 2019, 97:6952-6962.

Xu et al., "Learning to explore via meta-policy gradient," Proceedings of the 35th International Conference on Machine Learning, 2018, 80:5463-5472.

Xu et al., "Meta-gradient reinforcement learning," CoRR, May 2018, arxiv.org/abs/1805.09801, 17 pages.

Zheng et al., "On learning intrinsic rewards for policy gradient methods," CoRR, Jun. 2018, arxiv.org/abs/1804.06459, 15 pages.

\* cited by examiner

REINFORCEMENT LEARNING USING META-LEARNED INTRINSIC REWARDS

CROSS-REFERENCE TO RELATED APPLICATION

This application claims priority to U.S. Provisional Application No. 62/905,964, filed on Sep. 25, 2019. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment will be referred to in this specification as an observation.

According to a first aspect there is provided a method of training a reinforcement learning system, the reinforcement learning system comprising an agent configured to perform actions based upon a policy and an intrinsic reward system configured to generate intrinsic reward values for the agent based upon the actions taken by the agent, the method comprising: training the reinforcement learning system based upon a plurality of tasks, wherein the training comprises updating the agent's policy based upon the intrinsic reward values generated by the intrinsic reward system; updating the intrinsic reward system based upon an extrinsic reward value obtained based upon the task being performed by the agent; and re-initializing the agent's policy when an expiration criterion associated with the agent is met.

In this way, the actions of an agent may be driven by an intrinsic, or internally generated, reward. The intrinsic reward system persists across lifetimes of an agent. The intrinsic reward system may be learned based upon multiple generations of agents or policies performing a plurality of tasks and may maximize the long-term extrinsic reward, that is, the external reward provided through performing actions and interacting with environment, accumulated over the lifetime of an agent. Thus, the method of training may be considered a type of meta-learning, in particular for meta-learning the intrinsic reward which can be applied to any task, agent or reinforcement learning system.

The method may further comprise the following optional features.

Updating the agent's policy may comprise repeatedly updating the agent's policy for a plurality of updates on a same task and wherein updating the intrinsic reward system follows the repeated updating of the agent's policy. For example, the policy may be updated N times prior to updating the intrinsic reward system. N may be chosen based upon the expiration criterion associated with the agent or may be chosen to be an appropriate number of policy updates for evaluating the effect of the intrinsic reward system on the policy. The repeated updating of the agent's policy may be based upon the agent performing the training task to generate training episodes. It will be appreciated that where updating the intrinsic reward system follows the repeated updating of the agent's policy, the updating of the intrinsic reward system may be performed immediately after or at a future point in time after the repeated updating.

Updating the intrinsic reward system based upon an extrinsic reward value may comprise computing a policy gradient based upon maximizing an expected return accumulated over the lifetime of the agent, wherein the expected return is based upon the extrinsic reward values. In this way, the intrinsic reward system attempts to maximize the extrinsic rewards accumulated over the lifetime of an agent. A lifetime of an agent may correspond to a fixed number of interactions with an environment starting from a randomly initialized policy and may for example correspond to a number of training episodes. The expiration criterion may define the end of the lifetime of an agent and therefore the lifetime of the agent may run from the initialization of the agent's policy to the re-initialization of the agent's policy.

The policy gradient based upon maximizing an expected return accumulated over the lifetime of the agent may be computed based upon a lifetime return function, wherein the return function comprises a stochastic estimate of a lifetime return value. That is, rather than providing a value function that estimates the return for an episode, a value function that estimates a lifetime return is provided. The lifetime return function may be a parameterized multi-step bootstrapped lifetime return function. That is, the lifetime return function may be multi-step bootstrapped in the sense that for a particular number of steps, the return is computed for those steps, whilst for the remaining steps in the lifetime, a stochastic estimate of the lifetime return is used. The estimate may be obtained using a learned approximation of the lifetime value which may be a parametric function. For example, the stochastic estimate of the lifetime return value may be generated by a deep recurrent neural network. The lifetime return function may be parameterized by the parameters of the deep recurrent neural network. The deep recurrent neural network may be configured to process a state and to generate an estimate of the expected return over the agent's lifetime. The recurrent structure enables tracking of the current stage in the lifetime of the agent to estimate future rewards.

The method may further comprise updating one or more parameters of the lifetime return function. As noted above, the lifetime return function may be a multi-step bootstrapped lifetime return function. The updating may be performed on each update of the agent's policy. That is, updating the parameters of the multi-step bootstrapped lifetime return function may follow an update of the agent's policy and may occur for every update of the agent's policy. Alternatively, updating the parameters of the lifetime return function may occur less frequently. For example, the update may be carried out as part of updating the intrinsic reward system. Updating the parameters may include updating the parameters of the deep recurrent neural network providing the stochastic estimate of the lifetime return value where one exists. Updating the parameters of the lifetime return function may be based upon temporal difference learning. The parameters of the lifetime return function may be maintained when the expiration criterion of the agent is met. That is, unlike an agent's policy, the parameters of the lifetime return function are not reset and therefore the lifetime return function may improve its accuracy across generations of agents.

The policy gradient based upon maximizing an expected return accumulated over the lifetime of the agent may be further based upon accumulating a gradient computed based upon each update of the agent's policy. That is, each policy update may define a different policy and an extrinsic loss may be evaluated for each policy. A gradient may be computed based upon the extrinsic loss for each policy with respect to the parameters of the intrinsic reward system and summed to provide a total policy gradient for updating the intrinsic reward system.

Updating the agent's policy based upon the intrinsic reward values may comprise computing a policy gradient based upon maximizing an expected return accumulated over a training episode, wherein the expected return is based upon the intrinsic reward values. Thus, instead of maximizing an extrinsic reward associated with a task as in conventional reinforcement learning systems, an intrinsic reward is maximized. The policy may be defined by one or more policy parameters and updating the policy may comprise updating the one or more policy parameters. In this regard, the policy may be provided by a policy neural network.

The intrinsic reward system may be defined by one or more parameters which may be known as meta-parameters. The intrinsic reward system may comprise a recurrent neural network configured to generate the intrinsic reward value. The intrinsic reward system may be further configured to generate the intrinsic reward value based upon a history of the agent. The history of the agent may span a plurality of training episodes. The history of the agent may comprise at least one of the following: observations of the environment, the agent's actions, the extrinsic rewards obtained by the agent, and an indication of whether a state is terminal. Alternatively, the history of the agent may comprise the observations of the environment, the agent's actions, the extrinsic rewards obtained by the agent, and an indication of whether a state is terminal in combination. It will be appreciated that the extrinsic reward is generated by the environment in response to the agent's actions and thus may be considered as obtained by the agent. The expiration criterion may be based upon a number of training episodes completed by the agent.

The intrinsic and extrinsic reward values may be scalar values. The plurality of tasks may be randomly sampled from a task distribution. The agent's policy may be randomly initialized by sampling a policy distribution and re-initialized by resampling the policy distribution. An agent having a different policy may be considered to be a different agent.

According to another aspect, there is provided a system comprising one or more computers and one or more storage devices storing instructions that when executed by the one or more computers cause the one or more computers to perform the operations of the respective method of the first aspect.

According to further aspect, there is provided one or more computer storage media storing instructions that when executed by one or more computers cause the one or more computers to perform the operations of the respective method of the first aspect.

According to another aspect, there is provided a reinforcement learning system implemented by one or more processors comprising: an agent configured to perform actions based upon a policy; an intrinsic reward system configured to generate intrinsic reward values for the agent based upon the actions taken by the agent; and wherein the reinforcement learning system is trained according to the first aspect.

In some further aspects, which are modifications of the foregoing aspects, instead of the intrinsic reward system the reinforcement learning system has a meta-parameter determining system where the meta-parameter(s) determined may comprise parameters including, but not limited to: learning rate(s), hyperparameters of the reinforcement learning system, discount factor(s), and other meta-parameters. Updating the agent's policy based on the intrinsic reward values may then be replaced by updating the agent's policy based on the meta-parameter values.

It will be appreciated that features described in the context of one aspect may be combined with features of another aspect.

In some implementations, the reinforcement learning system is configured to receive observations, i.e., data, characterizing a current state of the environment, and in response to select actions to be performed by an agent interacting with an environment, e.g., to perform a task. In response to an action the agent may also receive a reward, that is an external or extrinsic reward, e.g., characterizing performance of a task. External rewards may be sparse. As used herein a return refers to a cumulative measure of reward received by the agent, for example, a time-discounted sum of rewards. An intrinsic reward is a reward which is typically distinct from an external reward and may be dependent upon a state of the environment, e.g., novelty of an observed state. An intrinsic reward is typically aimed at encouraging exploration of the state space by the agent. Intrinsic rewards may be less sparse than extrinsic rewards. Termination of an episode of interactions of the agent with the environment may be defined by performance (or failure of performance) of the task, or by achievement of some end result. The lifetime of an agent typically extends across episode boundaries until the agent expiration criterion is met.

The subject matter described in this specification can be implemented in particular embodiments so as to realize one or more of the following advantages.

Implementations of the above aspects provides improved methods and systems for training reinforcement learning systems by using a meta-learned intrinsic reward system. The intrinsic reward system is able to encourage both exploratory and exploitative behavior as necessary according to the task and environment. For example, the agent can be encouraged to explore uncertain states even if the overall episodic return is lower than average in order to gather useful information to maximize the extrinsic rewards in the long run. In this way, an agent is able to learn to maximize extrinsic rewards in shorter time than conventional methods relying upon an extrinsic reward only. Therefore, the use of an intrinsic reward system as provided herein is capable of accelerating the training of an agent and thus, the training system requires fewer computational resources, e.g., reduced processor cycles, reduced wall clock time, reduced power consumption, to train an agent.

The method is particularly effective in non-stationary environments or where short-term sacrifice may be required to achieve long-term rewards. The intrinsic reward system is capable of encoding knowledge relating to "what to do", e.g., explore particular areas of an environment, rather than knowledge relating to "how to do", e.g., the specific action to perform, which may be encoded by the agent's policy. The intrinsic reward system is also capable of capturing invariant casual relationships, for example, that a key is required to open a particular locked object, that may not be captured in purely extrinsic reward systems.

The method may be used to adapt any current reinforcement learning methods to make use of learned intrinsic rewards. The intrinsic reward may be used as the reward function in existing reinforcement learning system. In such cases, when combined with standard episodic reinforcement learning algorithms to learn an agent's policy, the intrinsic reward may optimize a cumulative extrinsic reward over the lifetime of the agent.

In addition, the intrinsic reward system as provided herein is capable of generalizing to other types of agent/reinforcement learning system. That is, the intrinsic reward system may be learned in conjunction with training one type of agent/reinforcement learning system and may be used effectively for training a different type of agent/reinforcement learning system. For example, the intrinsic reward system may be learned through training of an actor/critic type reinforcement learning system and still be used effectively in the training of a Q-learning type reinforcement learning system. In a similar manner, the intrinsic reward system is capable of generalizing to new action spaces, that is, actions that were not seen during the original training of the intrinsic reward system.

In some prior art methods where meta-learning is used to meta-learn a reward function, in order to evaluate the effect of meta-parameters (which defines the reward function) for more than just a single policy parameter update step, a meta-gradient is computed by unrolling the policy update steps and performing a backward-mode auto-differentiation. The number of steps that may be unrolled is constrained by the available memory for storing the data related to each update step. Thus, is it difficult to perform long-term meta-credit assignment and effectively meta-learn a reward function.

By using bootstrapping as described above, it is possible to perform long-term meta-credit assignment and to effectively meta-learn a reward function whilst avoiding the memory issues of prior art methods.

In addition, in some prior art methods, an exhaustive search is performed to discover a reward function that allows an agent to solve a distribution of tasks. The lack of scalability in terms of the computational requirements of exhaustive search (e.g., memory and processing power) means that only simple reward functions can be feasibly discovered with exhaustive search. The present disclosure provides a gradient based method for learning an intrinsic reward system for a distribution of tasks that is more scalable than an exhaustive search and also enables a more complex reward function to be learned.

BRIEF DESCRIPTION OF THE DRAWINGS

Like reference numbers and designations in the various drawings indicate like elements.

DETAILED DESCRIPTION

Figure 1:
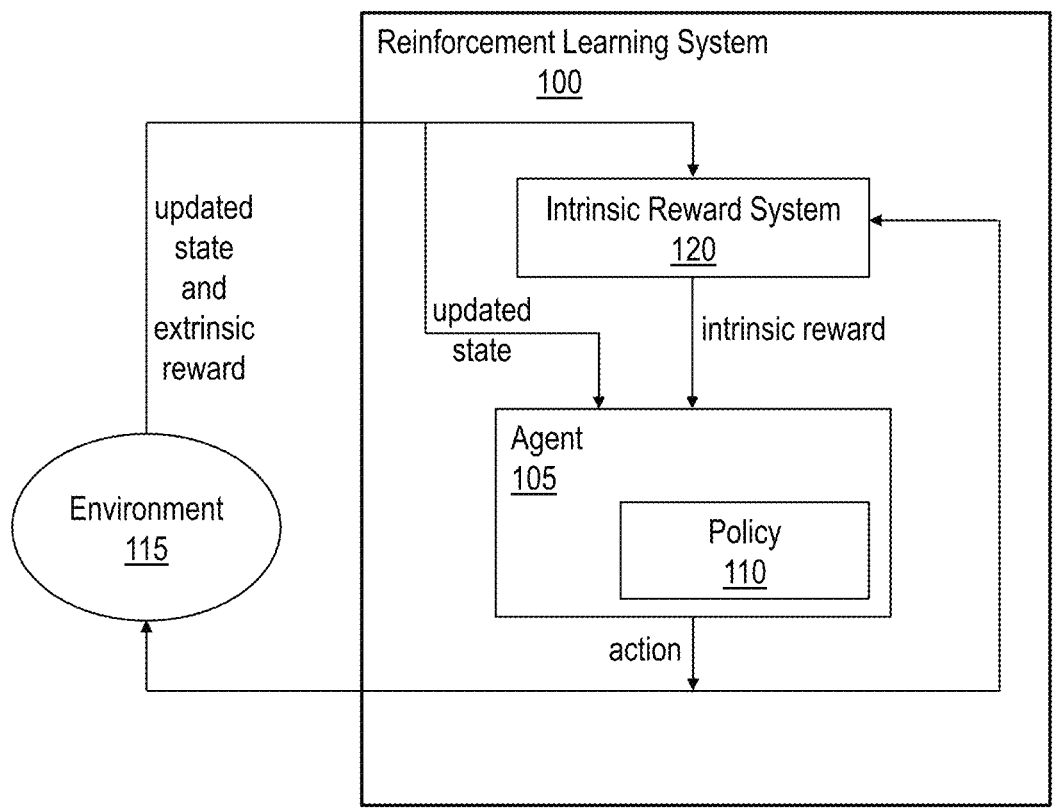
FIG. 1 is a schematic illustration of an exemplary reinforcement learning system including an intrinsic reward system for training an agent to interact with an environment.

This specification describes a system implemented as computer programs on one or more computers in one or more locations that can train an agent in a reinforcement learning system using an intrinsic reward system.

In broad terms a reinforcement learning system is a system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment is referred to in this specification as an observation. Optionally the observation at a time step may include data from a previous time step, e.g., the action performed at the previous time step, the reward received at the previous time step, and so forth.

In some implementations, the environment is a real-world environment and the agent is an electromechanical agent interacting with the real-world environment. For example, the agent may be a robot or other static or moving machine interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these implementations, the observations may include, for example, one or more of images, object position data, and sensor data to capture observations as the agent interacts with the environment, for example sensor data from an image, distance, or position sensor or from an actuator. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. For example in the case of a robot the observations may include data characterizing the current state of the robot, e.g., one or more of: joint position, joint velocity, joint force, torque or acceleration, and global or relative pose of a part of the robot such as an arm and/or of an item held by the robot. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands; or to control the autonomous or semi-autonomous land or air or sea vehicle, e.g., torques to the control surface or other control elements of the vehicle or higher-level control commands; or, e.g., motor control data. In other words, the actions can include for example, position, velocity, or force/torque/acceleration data for one or more joints of a robot or parts of another mechanical agent. Action data may include data for these actions and/or electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation, e.g., steering, and movement, e.g., braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle. A simulated environment can be useful for training a reinforcement learning system before using the system in the real world. In another example, the simulated environment may be a video game and the agent may be a simulated user playing the video game. Generally in the case of a simulated environment the observations may include simulated versions of one or more of the previously described observations or types of observations and the actions may include simulated versions of one or more of the previously described actions or types of actions.

In a further example the environment may be a chemical synthesis or a protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may include direct or indirect observations of a state of the protein or chemical/intermediates/precursors and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

In the case of an electronic agent the observations may include data from one or more sensors monitoring part of a plant or service facility such as current, voltage, power, temperature and other sensors and/or electronic signals representing the functioning of electronic and/or mechanical items of equipment. In some applications the agent may control actions in a real-world environment including items of equipment, for example in a facility such as: a data center, server farm, or grid mains power or water distribution system, or in a manufacturing plant or service facility. The observations may then relate to operation of the plant or facility. For example additionally or alternatively to those described previously they may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. For example the agent may control electrical or other power consumption, or water use, in the facility and/or a temperature of the facility and/or items within the facility. The actions may include actions controlling or imposing operating conditions on items of equipment of the plant/facility, and/or actions that result in changes to settings in the operation of the plant/facility, e.g., to adjust or turn on/off components of the plant/facility.

In some further applications, the environment is a real-world environment and the agent manages distribution of tasks across computing resources, e.g., on a mobile device and/or in a data center. In these implementations, the actions may include assigning tasks to particular computing resources. As further example, the actions may include presenting advertisements, the observations may include advertisement impressions or a click-through count or rate, and the reward may characterize previous selections of items or content taken by one or more users.

In general in the above described applications, where the environment is a simulated version of a real-world environment, once the system/method has been trained in the simulation it may afterwards be applied to the real-world environment. That is control signals generated by the system/method may be used to control the agent to perform a task in the real-world environment in response to observations from the real-world environment. Optionally the system/method may continue training in the real-world environment based on one or more rewards from the real-world environment.

The reinforcement learning system may be implemented as one or more computer programs on one or more computers in one or more locations in which the systems, components, and techniques described herein are implemented.

FIG. 1 illustrates an exemplary reinforcement learning system 100. The reinforcement learning system 100 comprises an agent 105 that is configured to perform actions based on a policy 110. Each time an action is determined, it is output to an environment 115 that the agent 105 is interacting with. The action updates a state of the environment 115. The updated state is returned to the reinforcement learning system 100 along with an associated extrinsic reward for the action. In this specification, a reward generated by the environment 115 is known as an extrinsic reward.

By contrast, an intrinsic reward is generated internally by the reinforcement learning system 100. In this regard, the reinforcement learning system 100 further comprises an intrinsic reward system 120. The intrinsic reward system 120 is configured to generate intrinsic rewards for the agent 105 based upon the action taken by the agent 105 and/or the updated state of the environment 115. The intrinsic reward may be generated based upon the extrinsic reward received from the environment 115 associated with the action and/or updated state. Whereas a conventional reinforcement learning system may train an agent based upon extrinsic rewards, the present reinforcement learning system 100 trains an agent 105 based upon intrinsic rewards. Training of the agent 105 is described in further detail below.

In general, the reward (intrinsic and extrinsic) is a numerical value. The reward may be based on any event or aspect of the environment 115. For example, the reward may indicate whether the agent 105 has accomplished a task (e.g., navigating to a target location in the environment 115) or the progress of the agent 105 towards accomplishing a task.

The agent 105 may be configured to receive the updated state and intrinsic reward and to determine a next action based upon the received data and the policy 110. In particular, for the performance of a particular task by the agent 105, through the generated intrinsic rewards, the intrinsic reward system 120 may be configured to encourage the agent 105 to explore the environment 115 in a certain way to obtain the information necessary to perform the task. Once the required information has been obtained, the intrinsic reward system 120 may be configured to encourage the agent 105 to interact with the environment to maximize the extrinsic reward generated by the environment 115. Thus, the intrinsic reward system 120 provides guidance for the agent 105 as to when to explore and when to exploit, that is, what to do, whilst the agent's policy 110 determines the actions for achieving such goals, i.e., how to do it. The intrinsic reward system 120 and the policy 110 may be trained to encode such knowledge. Training of the intrinsic reward system 120 and the policy 110 is described in further detail below.

In addition to a current action performed by the agent 105, the intrinsic reward system 120 may generate an intrinsic reward based upon a history of the agent 105. The history may comprise all previous observations of the environment (state), the agent's actions, the extrinsic rewards obtained, and an indication of whether a state is terminal, that is, whether the state is a final state of a training episode. The history may span a plurality of training episodes or all of the training episodes of the agent 105 to date. The agent 105 may be trained based upon a plurality of tasks. The history may include data spanning the plurality of tasks. The intrinsic reward may be generated based upon one or more recurrent neural networks. The history may be provided as input to the one or more recurrent neural networks to generate the intrinsic reward. The recurrent neural network may comprise an LSTM.

The policy 110 defines how the agent performs actions based on the state of the environment. The policy 110 followed by the agent 105 may be updated by assessing the value of actions according to an approximate value function, or return function to improve the expected return from the actions taken using the policy 110. This is typically achieved by a combination of prediction and control to assess the success of the actions performed by the agent 105, sometimes referred to as the "return". The return is calculated based on the rewards received following a given action, in this case, the intrinsic reward. For instance, the return might be an accumulation of multiple reward values over multiple time steps. An exemplary return is discussed in further detail below.

Figure 2:
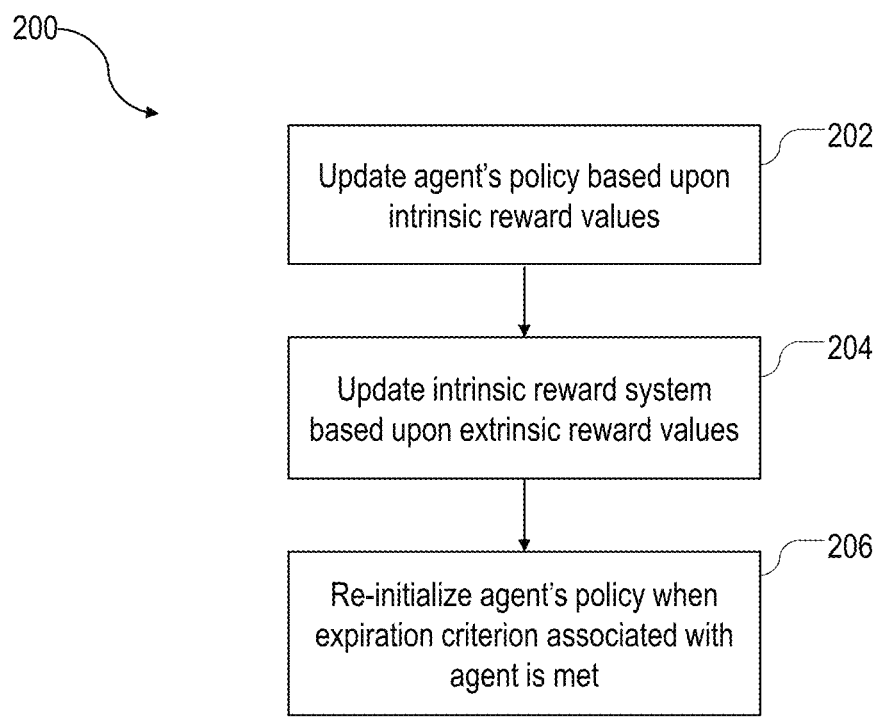
FIG. 2 is a flowchart illustrating an exemplary process for training the reinforcement learning system.

Training of the reinforcement learning system 100 will now be described. FIG. 2 provides a high-level illustration of a process 200 for training the reinforcement learning system 100 whilst FIG. 3 provides a more detailed example.

Referring back to FIG. 2, the reinforcement learning system 100 may be trained on a plurality of tasks. At step 202, the agent's policy 110 is updated based upon the intrinsic reward values generated by the intrinsic reward system 120 in the performance of the task or tasks. At step 204, the intrinsic reward system 120 is updated based upon an extrinsic reward value obtained based upon the task or tasks being performed by the agent 105. At step 206, the agent's policy 110 is re-initialized when an expiration criterion associated with the agent is met. Re-initialization of the agent's policy may comprise generating a new agent. In this regard, the new agent may be an agent using a different policy updating method. For example, a first agent may be trained using an actor-critic technique whilst a second agent may be trained using a Q-learning technique.

It will be appreciated that whilst an agent's policy may expire and be re-initialized, the intrinsic reward system 120 persists across the lifetimes of the agent(s) and accumulates knowledge from multiple generations of agents. Through this accumulated knowledge, the intrinsic reward system 120 is capable of accelerating the training of an agent 105 in the performance of a particular task as compared to a conventional reinforcement learning system that uses only extrinsic rewards for training the agent 105.

Figure 3:
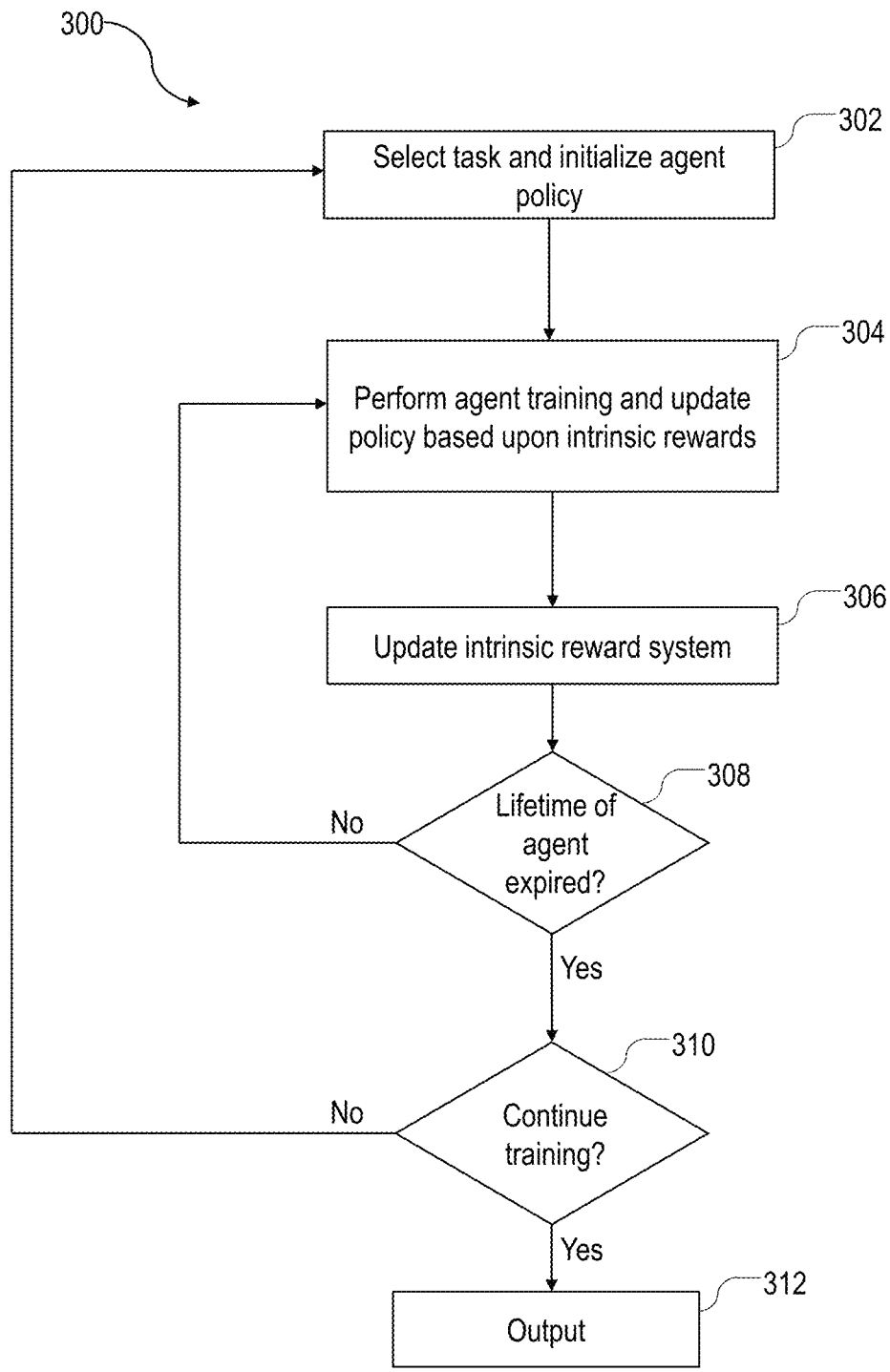
FIG. 3 is a flowchart illustrating an exemplary process for training the reinforcement learning system in more detail.

Referring now to FIG. 3, a more detailed exemplary process 300 for the training of the reinforcement learning system 100 will now be described. As noted above, the reinforcement learning system 100 may be trained on a plurality of tasks. At step 302, a task is selected. The task may be selected randomly from a distribution of tasks. The distribution of tasks may be stationary or non-stationary. The distribution of tasks may be provided as an input to the reinforcement learning system 100. The environment 115 may be specific to one or more tasks of the task distribution. As such, the environment 115 may be shared for all tasks, shared for a subset of tasks or may be different for all tasks.

Also at step 302, the agent's policy 110 is initialized. The agent's policy 110 may be initialized randomly from a policy distribution. The policy distribution may also be received as an input to the reinforcement learning system 100. For example, the agent's policy 110 may be implemented using a neural network and initializing the agent's policy 110 may comprise initializing the parameters of this policy neural network. The policy neural network may comprise one or more convolutional layers followed by one or more fully connected layers.

At step 304, the agent 105 is trained and the policy 110 is updated based upon the intrinsic rewards obtained during the training. For example, the training may comprise N iterations. For each iteration k=1, 2, ..., N, a trajectory may be generated using the current policy 110 $\pi_{\theta_{k-1}}$. The current policy 110 may be updated based upon the generated intrinsic reward from the trajectory using a policy gradient technique. For example, the intrinsic reward may be maximized in accordance with the objective function $J_\eta(\theta)$ and gradient $\nabla_\theta J_\eta(\theta)$ equation below:

$$J_\eta(\theta) = \mathbb{E}_\theta \left[ \sum_{t=0}^{T_{ep}-1} \bar{\gamma}^t r_\eta(\tau_{t+1}) \right]$$

$$\bar{\nabla}_\theta J_\eta(\theta) = \mathbb{E}_\theta [G^{ep}_{\eta,t} \bar{\nabla}_\theta \log \pi_\theta(a|s)]$$

where $r_\eta(\tau_{t+1})$ is the intrinsic reward at time t, and $G^{ep}_{\eta,t} = \sum_{k=t}^{T_{ep}-1} \bar{\gamma}^{k-t} r_\eta(\tau_{k+1})$ the return of the intrinsic reward accumulated over an episode with discount factor $\bar{\gamma}$, $T_{ep}$ is the number of steps until the end of the episode, $\pi_\theta$ is the policy parameterized by $\theta$, a is action and s is the state of the environment. In one example, the discount factor $\bar{\gamma}$=0.9 however, the discount factor may be set to any other value as deemed appropriate by a person skilled in the art.

In the above example, the policy 110 is updated on each time step k. However, it will be appreciated that the policy may be updated less frequently and in accordance with a schedule as deemed appropriate by a person skilled in the art.

At step 306, the intrinsic reward system 120 is updated. As such, the intrinsic reward system 120 may be updated after the completion of a set of policy updates. The intrinsic reward system 120 may be updated based upon maximizing the lifetime (extrinsic) return on the tasks drawn from the task distribution. For example, the maximization may be carried out according to the equation below:

$$\eta^* = \text{argmax}_\eta J(\eta) = \text{argmax}_\eta \mathbb{E}_{\eta_0 \sim \Theta, \mathcal{T} \sim p(\mathcal{T})}[\mathbb{E}_{\tau \sim p_\eta(\tau|\theta_0)}[G^{life}]]$$

where $\eta$ are the parameters of the intrinsic reward system 120, $\Theta$ and $p(\mathcal{T})$ are an initial policy distribution and a distribution over tasks, $G^{life} = \sum_{t=0}^{T-1} \gamma^t r_{t+1}$ is the lifetime return, the likelihood of a lifetime history $\tau$ is $p_\eta(\tau|\theta_0) = p(s_0) \Pi_{t=0}^{T-1} \pi_\theta(a_t|s_t) p(d_{t+1}, r_{t+1}, s_{t+1}, a_t)$ where d is a binary variable indicating the end of an episode, and $\theta_t = f(\theta_{t-1}, \eta)$ is a policy parameter as updated with update function $f$, for example, policy gradient.

Using the lifetime return $G^{life}$ as the objective instead of the episodic return $G^{ep}$ allows exploration across multiple episodes as long as the lifetime return is maximized in the long run. In some cases, the lifetime return objective may even be more beneficial than the episodic return objective even when considering episodic return performance. It will be appreciated that different objectives may be used as deemed appropriate for the task distribution and what a good reward function should be. For example, a final episode return may be used.

The parameters $\eta$ of the intrinsic reward system 120 may be updated by taking a meta-gradient ascent step based upon the above objective. It will be appreciated that computing the meta-gradient may be considered to be computing a policy gradient to maximize the extrinsic rewards accumulated over the agent's lifetime.

For example, the gradient of the above objective function with respect to $\eta$ may be defined as:

$$\nabla_\eta J(\eta) = \mathbb{E}_{\theta_0 \sim \Theta, \mathcal{T} \sim p(\mathcal{T})}[\mathbb{E}_{\tau_t \sim p(\tau_t|\eta, \theta_0)}[G_t^{life} \nabla_{\theta_t} \log \pi_{\theta_t}(a_t|s_t) \nabla_\eta \theta_t]]$$

where $G^{life} = \sum_{k=t}^{T-1} \gamma^{k-t} r_{k+1}$ is a lifetime return based on the extrinsic rewards of task $\mathcal{T}$ with discount factor $\gamma$. The chain rule may be used to determine the meta-gradient $\nabla_\eta \theta_t$. Such a technique is described in more detail in Zheng et al., "On learning intrinsic rewards for policy gradient methods" in *Advances in Neural Information Processing Systems*, pp. 4644-4654, 2018 which is hereby incorporated by reference in its entirety.

In one example, the discount factor $\gamma$=0.99 however, the discount factor may be set to any other value as deemed appropriate by a person skilled in the art.

Computing the true meta-gradient as above may require backpropagation through the entire lifetime of the agent 105. This may be infeasible due to memory limitations as each lifetime can involve more than thousands of policy updates. As such, the meta-gradient may be truncated after N policy updates and the lifetime return may be approximated using a lifetime value function $V_\phi(\tau)$ parameterized by $\phi$ for estimating the remaining lifetime return. The lifetime value function may be learned using temporal difference learning from an n-step trajectory in accordance with the below:

$$G_t^{life,\phi} = \sum_{k=0}^{n-1} \gamma^k r_{t+k+1} + \gamma^n V_\phi(\tau_{t+n})$$

$$\phi = \phi + \alpha'(G_t^{life,\phi} - V_\phi(\tau_t))\nabla_\phi V_\phi(\tau_t)$$

In one example, N=5 however, it will be appreciated that other values may be used as deemed appropriate by a person skilled in the art.

It will be appreciated that $G_t^{life,\phi}$ may be considered to be a parameterized multi-step bootstrapped lifetime return function that comprises a stochastic estimate of a lifetime return value.

The lifetime value function may be implemented using a recurrent neural network parameterized by $\phi$. This may be separate to any recurrent neural network implementing an intrinsic reward function parameterized by $\eta$. Thus, the intrinsic reward system 120 may comprise a first recurrent neural network configured to generate an intrinsic reward value and a second recurrent neural network configured to estimate a lifetime value. The first recurrent neural network for generating an intrinsic reward value may comprise one or more LSTMs. The first recurrent neural network may further comprise one or more convolutional layers. The first recurrent neural network may also comprise one or more fully connected layers.

At step 308, it is determined whether the lifetime of the agent 105 (and/or policy 110) has expired. For example, an expiration criterion may be a number of episodes that the agent 105 or policy 110 has carried out. The number of episodes may be dependent on the complexity of the task.

If the lifetime of the agent 105 (and/or policy 110) has not expired, processing returns to step 304 where a further training episode and subsequent parameter updates are carried out. If the lifetime of the agent 105 (and/or policy 110) has expired then processing proceeds to step 310 to determine whether training should continue. For example, training may continue if the parameters of the intrinsic reward system 120 are determined to have sufficiently converged or if a certain number of training steps have been carried out or any other measure as deemed appropriate by a person skilled in the art.

If the training is to continue, then processing returns to step 302 where a new task is selected. If training is to stop, then an output, for example, the parameters of the intrinsic reward system 120 may be provided at step 312. As will be appreciated, the optimization of intrinsic reward system 120 may span multiple lifetimes, each of which may span multiple episodes.

In the above, updating the lifetime value function was described as part of the update of the intrinsic reward system 120 at step 306. Alternatively, the lifetime value function may be updated after each update of the agent's policy at step 304.

To reduce the variance of the meta-gradient estimation, mini-batch updates may be used. For example, a number of agents 105 may be trained in parallel, each with a randomly sampled task and policy initialization. The meta-gradients from each agent lifetime may be averaged to compute the update the intrinsic reward system. In one exemplary process, 64 lifetimes were run in parallel. A total of 2 x10^5 updates to the intrinsic reward system were carried out during training of the reinforcement learning system.

Figure 4:
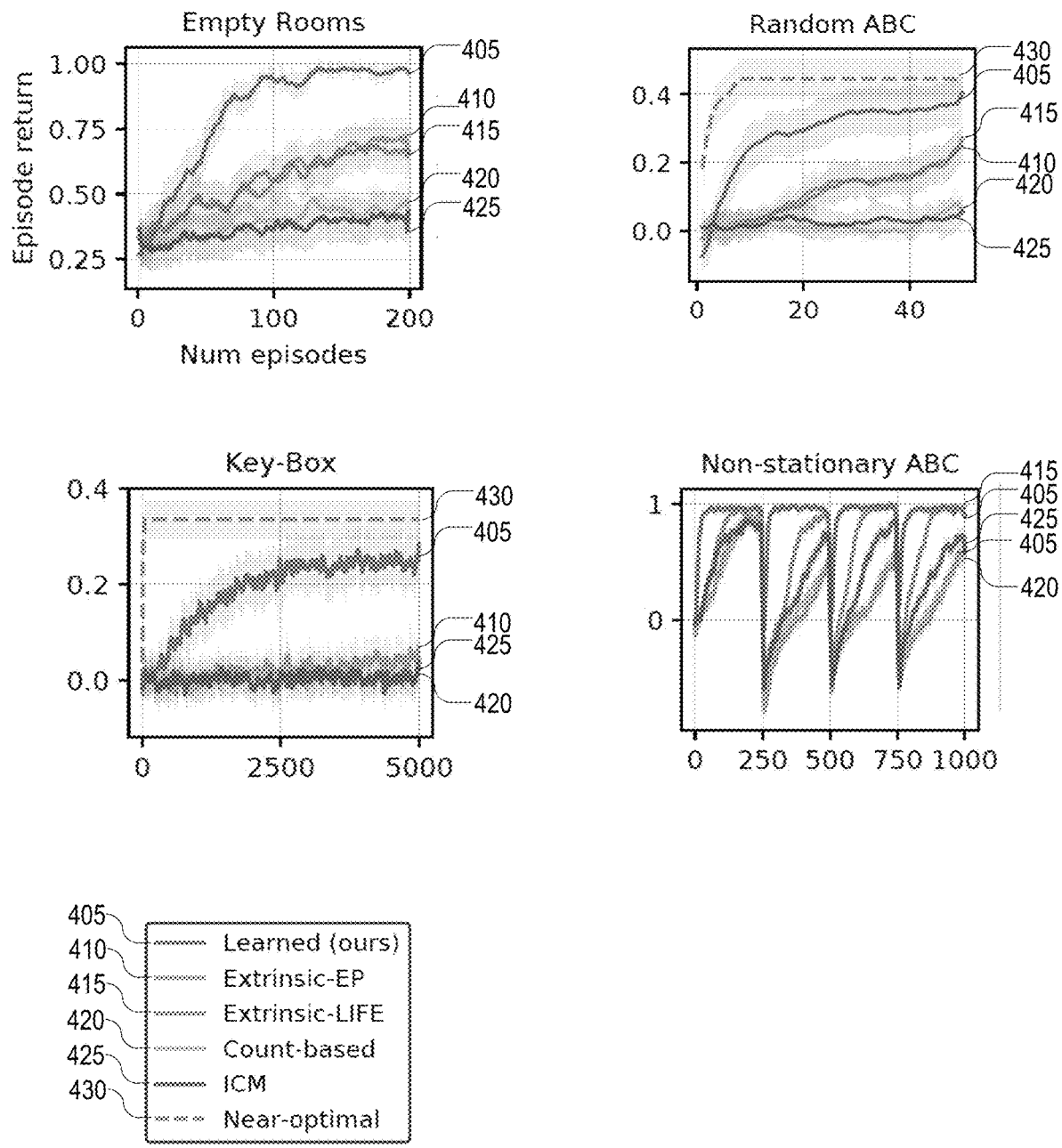
FIG. 4 is a plot of training dynamics comparing the present reinforcement learning system and other types of reinforcement learning systems for various tasks.
Figure 5:
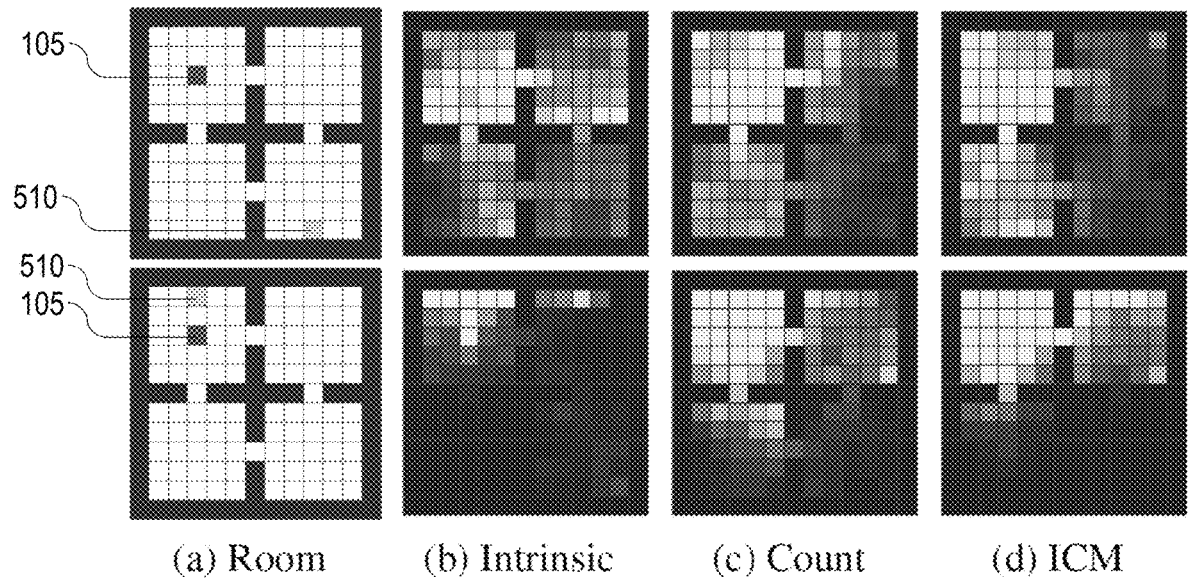
FIG. 5 is a visualization of an agent's actions trained using the present reinforcement learning system compared to other policy types on a particular task.
Figure 6:
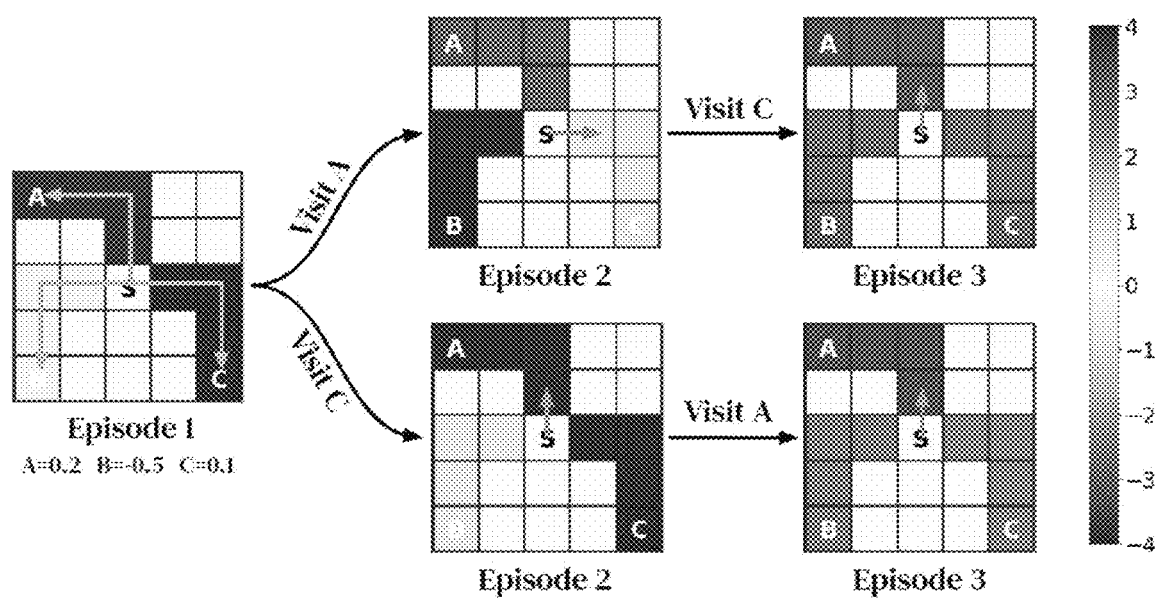
FIG. 6 is a visualization of the intrinsic reward learned for guiding an agent on a particular task.

FIGS. 4 to 6 provides various visualizations of an agent undergoing the training processes described above. In more detail, FIG. 4 illustrates a plot of episodic return as a function of the number of episodes on various tasks. The plot provides a comparison of a reinforcement learning system 100 comprising an intrinsic reward system 120 in blue 405, an agent trained using an extrinsic reward using an episodic return objective in orange 410, an agent trained using an extrinsic reward using a lifetime return objective in brown 415, a count-based exploration reward in green 420 and an agent trained using extrinsic rewards and curiosity rewards based on an inverse dynamics model (ICM) in purple 425. Dashed lines 430 correspond to a hand-designed near-optimal exploration strategy where applicable. As can be seen from FIG. 4, the reinforcement learning system 100 comprising an intrinsic reward system 120 as described herein not only provides an increased episodic return but also at a much faster rate. Thus, the present reinforcement learning system requires fewer computational resources to train a more optimal agent.

Referring now to FIG. 5, a visualization of the first 3000 steps of an agent trained with different reward functions is shown. FIG. 5(a) depicts two exemplary environments according an "Empty Room" task. In this task, the goal of the agent 105 is to discover a hidden goal 510 in the environment 115. Once the goal is found, the agent should exploit this knowledge for the rest of the lifetime. FIG. 5(b) provides a visualization for a reinforcement learning system 100 comprising an intrinsic reward system 120. FIG. 5(c) shows a visualization for an agent trained using a count-based exploration reward. FIG. 5(d) shows a visualization for an agent trained using ICM. As can been seen from the top visualization of FIG. 5(b), the intrinsic reward system 120 encourages the agent to visit many locations if the goal is not found. Whilst in the bottom visualization of FIG. 5(b), if the agent discovers the goal early, the intrinsic reward system 120 encourages the agent to exploit without further exploration given that the intrinsic reward system 120 has learned that only one goal exists. By comparison, the count-based and ICM methods shown in FIGS. 5(c) and 5(d) encourages exploration but hinders exploitation when the goal is found (bottom row). As such, the intrinsic reward system 120 is capable of determining when to explore and when to exploit more effectively.

Referring now to FIG. 6, a visualization of the learned intrinsic reward for a "Random ABC" task is shown. In this task, three objects, A, B and C, are randomly assigned extrinsic rewards from the range A[−1, 1,], B[−0.5, 0], and C[0, 0.5] at the start of the lifetime and held fixed for the duration of the lifetime. In FIG. 6, object A in the environment has an extrinsic reward of 0.2, object B in the environment has an extrinsic reward of −0.5 and object C in the environment has an extrinsic reward of 0.1. The optimal behavior is to explore A and C at the beginning of a lifetime to assess which is better and then to commit to the better one for all subsequent episodes. As shown in FIG. 6, the reinforcement learning system 100 comprising an intrinsic reward system 120 demonstrates such behavior.

In more detail, each visualization of FIG. 6 shows the sum of intrinsic rewards for a trajectory towards each object. FIG. 6(a) shows a first episode in which the intrinsic reward encourages the agent to explore A. In the second episode, if A was visited, the intrinsic reward encourages the agent to explore C as shown in FIG. 6(b). If C was visited, the intrinsic reward encourages the agent to explore A as shown in FIG. 6(c). In the third episode, in both cases, as shown in FIGS. 6(d) and (e), the agent is encouraged to revisit A to obtain the maximal extrinsic reward. Thus, the visualization of FIG. 6 further demonstrates that the intrinsic reward system 120 is capable of determining when to explore to obtain the necessary task information and then to exploit once the information has been obtained.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of training a reinforcement learning system, the reinforcement learning system comprising an agent configured to perform actions based upon a policy and an intrinsic reward system configured to generate intrinsic reward values for the agent based upon the actions taken by the agent, the method comprising:
training the reinforcement learning system by updating the agent's policy based upon, for each of a plurality of task episodes performed by the agent and each corresponding to a respective task, a first objective that measures an expected return accumulated within the task episode, the training comprising, for each of the plurality of task episodes:
at each of a plurality of time steps within the task episode, determining a respective intrinsic reward value for the time step using the intrinsic reward system conditioned on a history of the agent at earlier time steps within the task episode and at time steps during previous task episodes across a lifetime of the agent, wherein the lifetime of the agent comprises the plurality of task episodes; and
updating the intrinsic reward system based upon a second objective that measures, for a particular time step within a particular one of the plurality of task episodes, an expected return accumulated across a remainder of the lifetime of the agent subsequent to the particular time step, wherein the expected return accumulated across the remainder of the lifetime of the agent is determined based on extrinsic reward values at one or more subsequent time steps and on an approximation of a lifetime extrinsic reward for subsequent task episodes during the remainder of the lifetime of the agent generated by a lifetime return function.

2. A method according to claim 1, wherein the history of the agent comprises at least one of the following: observations of the environment, the agent's actions, the extrinsic rewards, or an indication of whether a state is terminal.

3. A method according to claim 1, wherein updating the agent's policy comprises repeatedly updating the agent's policy for a plurality of updates on a same task and wherein updating the intrinsic reward system follows the repeated updating of the agent's policy.

4. A method according to claim 1, wherein updating the intrinsic reward system comprises computing a policy gradient based upon maximizing the expected return accumulated over the lifetime of the agent.

5. A method according to claim 4, wherein the policy gradient based upon maximizing the expected return accumulated over the lifetime of the agent is computed based upon the lifetime return function, wherein the return function comprises a stochastic estimate of a lifetime return value.

6. A method according to claim 5, wherein the stochastic estimate of the lifetime return value is generated by a deep recurrent neural network.

7. A method according to claim 6, wherein the method further comprises updating one or more parameters of the lifetime return function.

8. A method according to claim 7, wherein updating the parameters of the lifetime return function is based upon temporal difference learning.

9. A method according to claim 8, wherein the parameters of the lifetime return function are maintained when an expiration criterion for re-initializing the policy of the agent is met.

10. A method according to claim 4, wherein the policy gradient based upon maximizing the expected return accumulated over the lifetime of the agent is further based upon accumulating a gradient computed based upon each update of the agent's policy.

11. A method according to claim 1, wherein updating the agent's policy comprises, for each task episode, computing a policy gradient based upon maximizing the expected return accumulated within the task episode.

12. A method according to claim 1, wherein the intrinsic reward system comprises a recurrent neural network configured to generate the respective intrinsic reward values.

13. A method according to claim 1, further comprising:
re-initializing the agent's policy when an expiration criterion is met, wherein the expiration criterion is based upon a number of training episodes completed by the agent.

14. A method according to claim 1, wherein the agent's policy is provided by a policy neural network.

15. A system comprising one or more computers and one or more storage devices storing instructions that when executed by the one or more computers cause the one or more computers to perform operations for training a reinforcement learning system, the reinforcement learning system comprising an agent configured to perform actions based upon a policy and an intrinsic reward system configured to generate intrinsic reward values for the agent based upon the actions taken by the agent, the operations comprising:
training the reinforcement learning system by updating the agent's policy based upon, for each of a plurality of task episodes performed by the agent and each corresponding to a respective task, a first objective that measures an expected return accumulated within the task episode, the training comprising, for each of the plurality of task episodes:
at each of a plurality of time steps within the task episode, determining a respective intrinsic reward value for the time step using the intrinsic reward system conditioned on a history of the agent at earlier time steps within the task episode and at time steps during previous task episodes across a lifetime of the agent, wherein the lifetime of the agent comprises the plurality of task episodes; and
updating the intrinsic reward system based upon a second objective that measures, for a particular time step within a particular one of the plurality of task episodes, an expected return accumulated across a remainder of the lifetime of the agent subsequent to the particular time step, wherein the expected return accumulated across the remainder of the lifetime of the agent is determined based on extrinsic reward values at one or more subsequent time steps and on an approximation of a lifetime extrinsic reward for subsequent task episodes during the remainder of the lifetime of the agent generated by a lifetime return function.

16. One or more non-transitory computer-readable storage media storing instructions that when executed by one or more computers cause the one or more computers to perform operations for training a reinforcement learning system, the reinforcement learning system comprising an agent configured to perform actions based upon a policy and an intrinsic reward system configured to generate intrinsic reward values for the agent based upon the actions taken by the agent, the operations comprising:
training the reinforcement learning system by updating the agent's policy based upon, for each of a plurality of task episodes performed by the agent and each corresponding to a respective task, a first objective that measures an expected return accumulated within the task episode, the training comprising, for each of the plurality of task episodes:

at each of a plurality of time steps within the task episode, determining a respective intrinsic reward value for the time step using the intrinsic reward system conditioned on a history of the agent at earlier time steps within the task episode and at time steps during previous task episodes across a lifetime of the agent, wherein the lifetime of the agent comprises the plurality of task episodes; and updating the intrinsic reward system based upon a second objective that measures, for a particular time step within a particular one of the plurality of task episodes, an expected return accumulated across a remainder of the lifetime of the agent subsequent to the particular time step, wherein the expected return accumulated across the remainder of the lifetime of the agent is determined based on extrinsic reward values at one or more subsequent time steps and on an approximation of a lifetime extrinsic reward for subsequent task episodes during the remainder of the lifetime of the agent generated by a lifetime return function.

17. A reinforcement learning system, the system comprising:
an agent configured to perform actions based upon a policy, and
an intrinsic reward system implemented by one or more computers and configured to generate intrinsic reward values for the agent based upon the actions taken by the agent; and
wherein the reinforcement learning system is trained by performing operations comprising:
training the reinforcement learning system by updating the agent's policy based upon, for each of a plurality of task episodes performed by the agent and each corresponding to a respective task, a first objective that measures an expected return accumulated within the task episode, the training comprising, for each of the plurality of task episodes:

at each of a plurality of time steps within the task episode, determining a respective intrinsic reward value for the time step using the intrinsic reward system conditioned on a history of the agent at earlier time steps within the task episode and at time steps during previous task episodes across a lifetime of the agent, wherein the lifetime of the agent comprises the plurality of task episodes; and updating the intrinsic reward system based upon a second objective that measures, for a particular time step within a particular one of the plurality of task episodes, an expected return accumulated across a remainder of the lifetime of the agent subsequent to the particular time step, wherein the expected return accumulated across the remainder of the lifetime of the agent is determined based on extrinsic reward values at one or more subsequent time steps and on an approximation of a lifetime extrinsic reward for subsequent task episodes during the remainder of the lifetime of the agent generated by a lifetime return function.

18. A system according to claim 15, wherein the history of the agent comprises at least one of the following: observations of the environment, the agent's actions, the extrinsic rewards, or an indication of whether a state is terminal.

19. A system according to claim 15, wherein updating the agent's policy comprises repeatedly updating the agent's policy for a plurality of updates on a same task and wherein updating the intrinsic reward system follows the repeated updating of the agent's policy.

20. A system according to claim 15, wherein updating the intrinsic reward system comprises computing a policy gradient based upon maximizing the expected return accumulated over the lifetime of the agent.

* * * * *